United States Patent
Shao et al.

(10) Patent No.: US 12,022,250 B2
(45) Date of Patent: Jun. 25, 2024

(54) LOUDSPEAKER AND INSTALLATION STRUCTURE FOR SAME

(71) Applicant: AAC Microtech (Changzhou) Co., Ltd., Changzhou (CN)

(72) Inventors: Tao Shao, Shenzhen (CN); Xudong Yan, Shenzhen (CN); Xiaojiang Gu, Shenzhen (CN)

(73) Assignee: AAC MICROTECH (CHANGZHOU) CO., LTD., Changzhou (CN)

( * ) Notice: Subject to any disclaimer, the term of this patent is extended or adjusted under 35 U.S.C. 154(b) by 116 days.

(21) Appl. No.: 17/840,592

(22) Filed: Jun. 14, 2022

(65) Prior Publication Data

US 2023/0217142 A1 Jul. 6, 2023

(30) Foreign Application Priority Data

Dec. 31, 2021 (CN) .......................... 202123447474.5

(51) Int. Cl.
*H04R 1/02* (2006.01)
*H04R 9/06* (2006.01)
*H04R 7/16* (2006.01)

(52) U.S. Cl.
CPC .................. *H04R 1/02* (2013.01); *H04R 9/06* (2013.01); *H04R 7/16* (2013.01)

(58) Field of Classification Search
CPC .......... H04R 1/02; H04R 1/021; H04R 1/026; H04R 7/16; H04R 9/02; H04R 9/025; H04R 9/04; H04R 9/045; H04R 9/06; H04R 11/02; H04R 19/02; H04R 2201/02; H04R 2201/029
See application file for complete search history.

(56) References Cited

U.S. PATENT DOCUMENTS

| | | | |
|---|---|---|---|
| 2009/0034777 A1* | 2/2009 | Nho | H04R 1/021 455/575.1 |
| 2011/0200223 A1* | 8/2011 | Hiwatashi | H04R 9/02 381/400 |
| 2014/0348349 A1* | 11/2014 | Nagaoka | C09J 9/00 381/162 |
| 2022/0312097 A1* | 9/2022 | Ko | H04R 1/1075 |

FOREIGN PATENT DOCUMENTS

| | | | | |
|---|---|---|---|---|
| CN | 211481460 U | * | 9/2020 | ............... H04R 1/28 |
| CN | 113194392 A | * | 7/2021 | ............... H04R 9/06 |

OTHER PUBLICATIONS

English Translation of CN-211481460-U, Date Sep. 11, 2020.*

* cited by examiner

*Primary Examiner* — Thang V Tran
(74) *Attorney, Agent, or Firm* — W&G Law Group

(57) ABSTRACT

The application discloses a loudspeaker and an installation structure. The loudspeaker includes a front surface and a back surface. The loudspeaker includes an installation frame and a loudspeaker body installed on the installation frame. The installation frame is provided with a guiding hole passing through the front surface and the back surface. By opening a guiding hole passing through the front surface and the back surface on the installation frame, the sound generated by the back surface of the loudspeaker can be directed to the front surface of the loudspeaker through the conduction of the guiding hole. The sound of the front surface of loudspeaker is strengthened, which can greatly improve the loudness of the loudspeaker.

6 Claims, 3 Drawing Sheets

LOUDSPEAKER AND INSTALLATION STRUCTURE FOR SAME

FIELD OF THE PRESENT DISCLOSURE

The application relates to the technical field of electro-acoustic transducers, in particular to a loudspeaker and an installation structure.

DESCRIPTION OF RELATED ART

The vehicle loudspeaker is an important part of the vehicle entertainment system, providing functions such as music playback and voice interaction. Vehicle-mounted loudspeaker with conventional structure, the better the performance, the larger the required size. However, the installation space of vehicle-mounted loudspeaker such as vehicle door is limited, and the size of the vehicle-mounted loudspeaker is greatly restricted. Therefore, a new vehicle-mounted loudspeaker is required to play a better sound effect in the limited space.

SUMMARY OF THE PRESENT INVENTION

The application provides a loudspeaker and an installation structure to solve the problem of insufficient sound loudness of the existing loudspeaker.

Accordingly, the present invention provides a loudspeaker, having: a front surface; a back surface; an installation frame having a guiding hole passing through the front surface and the back surface; and a loudspeaker body engaging with the installation frame.

Further, the installation frame includes: a frame for supporting the loudspeaker body; a support body with a central through hole along a height direction for engaging with the frame; and wherein one end of the central through hole is sealed by the loudspeaker body, and the other end is opened; and wherein the guiding hole is formed in the support body along the height direction.

Further, the guiding hole is an annular hole opened along a circumferential direction of the support body.

Further, the loudspeaker includes multiple guiding holes arranged along the circumferential direction of the support body.

Or, the loudspeaker includes a weight losing groove formed in the support body, wherein a notch of the weight losing groove faces the loudspeaker.

The application further provides an installation structure, including: a main installation body with an installation hole and an inner chamber communicating with the installation hole; a loudspeaker as described above installed in the installation hole and including a guiding hole. A back surface of the loudspeaker faces the inner chamber; the guiding hole is connected with the inner chamber.

Further, the installation hole includes a first mounting hole and a second mounting hole communicating with the first mounting hole and the inner chamber; the loudspeaker is installed in the first mounting hole.

Further, a diameter of the first mounting hole is larger than that of the second mounting hole; an installation surface is formed between the first mounting hole and the second mounting hole; the installation frame is in contact with the installation surface; and the installation surface is staggered from the guiding hole.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
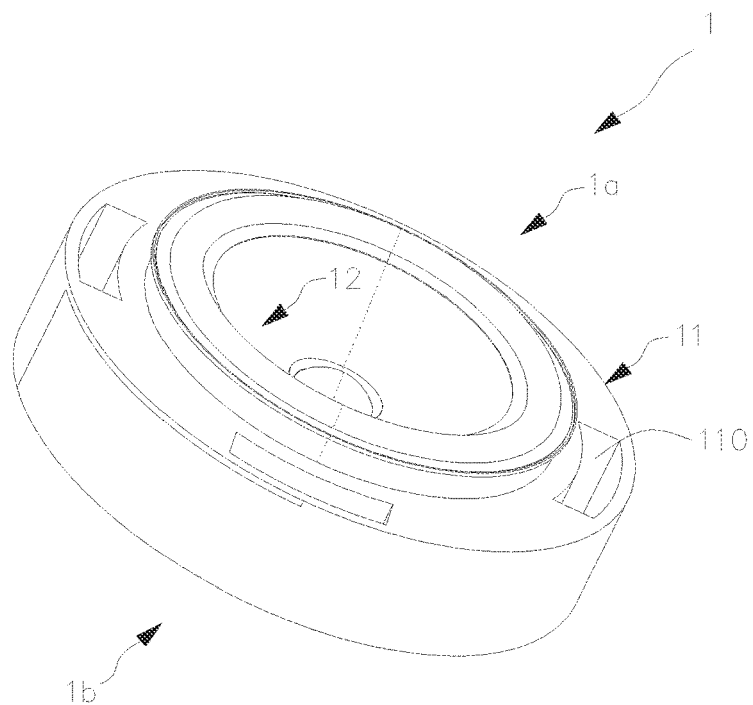
FIG. 1 is an isometric view of a loudspeaker in accordance with an exemplary embodiment of the present application, from an aspect.

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

It should be understood that the term "and/or" used in this document is only an association relationship to describe associated objects, indicating that there may be three kinds of relationships, for example, a and/or B, which may indicate: There are three cases where A exists alone, A and B exist at the same time, and B exists alone. In addition, the character "/" in this document generally indicates that the related objects are an "or" relationship.

It should be noted that the orientation words such as "upper", "lower", "left" and "right" described in the embodiment of the application are described from the angles shown in the drawings, it should not be construed as a limitation on the embodiment of the application. Also, in this context, it should also be understood that when an element is referred to as being "on" or "under" another element, it can not only be directly connected "on" or "under" the other element, but also Indirectly connected "on" or "under" another element through middle elements.

The embodiment of the application provides a loudspeaker. the loudspeaker can be applied to, but not limited to, vehicles such as buses and vehicles. It can be mainly installed on vehicle doors, vehicle underwear and hat racks, etc. the loudspeaker has a loudness advantage.

According to some specific embodiment of the application, as shown in FIG. 1, the application provides a loudspeaker, the loudspeaker 1 is arranged with a front surface 1a and a back surface 1b, the loudspeaker 1 includes an installation frame 11 and a loudspeaker body 12, and the loudspeaker body 12 is installed on the installation frame 11. The installation frame 11 is provided with a guiding hole 110 passing through the front surface 1a and the back surface 1b.

The shape of the loudspeaker body 12 may be circular, oval or other shapes.

The loudspeaker 1 of this embodiment includes the loudspeaker body 12 and the installation frame 11 for fixing the loudspeaker body 12. the installation frame 11 is arranged with a certain protective effect on the loudspeaker body 12, and at the same time facilitates the installation of the loudspeaker body 12 on the main installation body. A guiding hole 110 is opened on the installation frame 11, and the guiding hole 110 penetrates the front surface 1*a* and the back surface 1*b*. the sound generated by the back surface 1*b* of the loudspeaker 1 can be guided to the front surface 1*a* of the loudspeaker 1 by the conduction of the guiding hole 110. The sound of the front surface of the loudspeaker 1 is strengthened, which can greatly improve the loudness of the loudspeaker 1.

Figure 2:
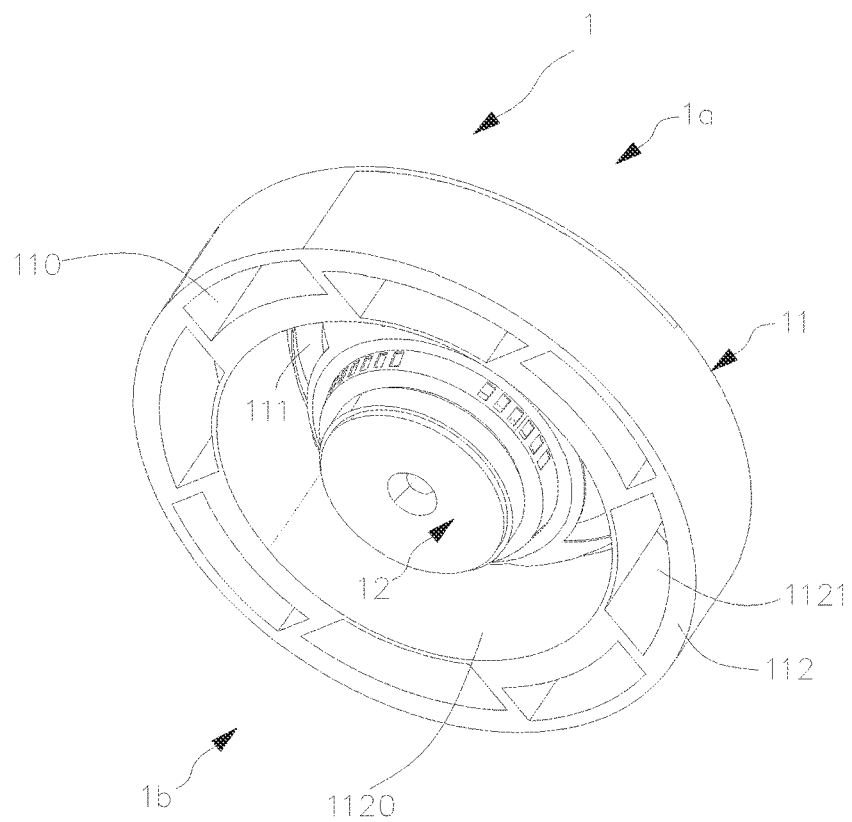
FIG. 2 is an isometric view of the loudspeaker, from another aspect.
Figure 3:
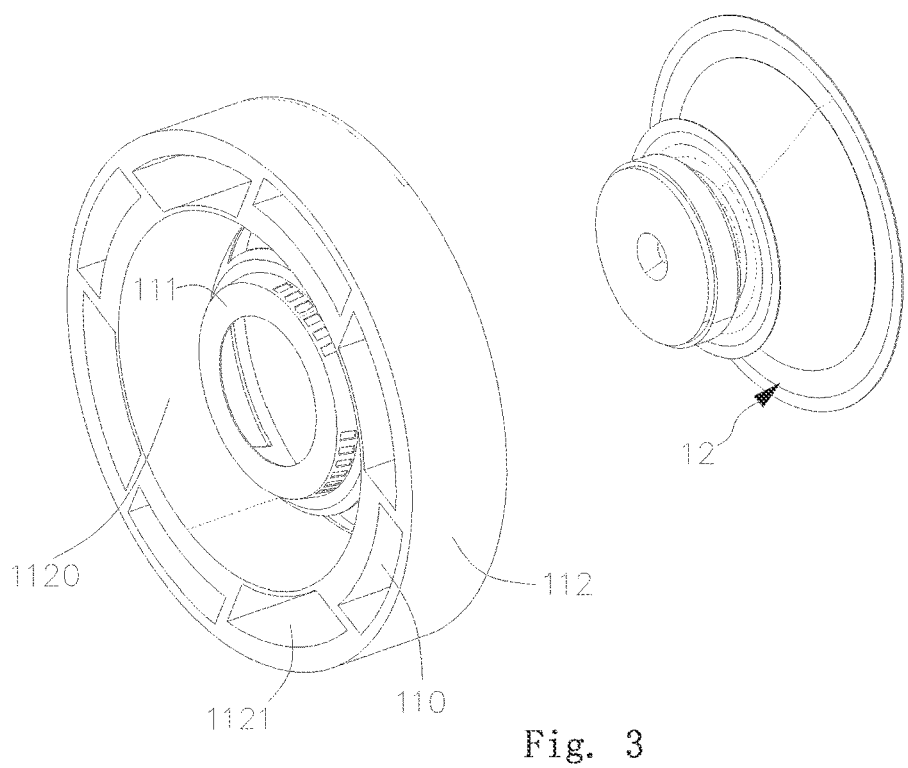
FIG. 3 is an exploded view of the loudspeaker in FIG. 1.

According to some specific embodiment of the application, as shown in FIG. 2 and FIG. 3, the installation frame 11 includes a frame 111 and a support body 112, and the loudspeaker body 12 is installed in the frame 111. The support body 112 is provided with a central through hole 1120 along the height direction, and a frame 111 is installed in the central through hole 1120. central through hole 1120 is sealed by the loudspeaker body 12, and the other end is opened. The support body 112 is provided with a guiding hole 110 along the height direction.

In this embodiment, the installation frame 11 includes the frame 111 and the support body of the basin 112, the frame 111 is used to install the loudspeaker body 12, the support body of the basin 112 is provided with a central through hole 1120 along the height direction, the frame 111 is installed in the central through hole 1120, the support body of the basin 112 plays a supporting and protective role for the frame 111. One end of the central through hole 1120 is sealed by the loudspeaker body 12, the other end is opened, and the sealed end of the central through hole 1120 is the mouth end of the loudspeaker body 12. Most of the sound emitted by the loudspeaker body 12 comes from the loudspeaker mouth, but some of the sound is diffused from the surroundings. The loudspeaker body 12 is installed in the central through hole 1120 of the support body 112, and the support body 112 can also play a certain sound-receiving effect. The sound collected inside the support body 112 can pass through the opening end of the central through hole 1120, and finally lead to the front surface 1*a* of the loudspeaker 1 through the guiding hole 110. The sound of the front surface of the loudspeaker 1 is strengthened, which can greatly improve the loudness of the loudspeaker 1. In addition, through the connection between the support body 112 and the main installation body, the loudspeaker 1 can be installed on the main installation body.

According to some specific embodiments of the application, the guiding hole 110 is one, and the guiding hole 110 is an annular hole opened along the circumferential direction of the support body 112.

In this embodiment, the guiding hole 110 is an annular hole opened along the circumferential direction of the support body 112, so that the sound generated by the back surface 1*b* of the loudspeaker 1 can be directed to the front surface 1*a* of the loudspeaker 1 in all directions.

According to some specific embodiments of the application, as shown in FIG. 2 and FIG. 3, there are multiple guiding holes 110, and the multiple guiding holes 110 are arranged at intervals along the circumferential direction of the support body 112.

In this embodiment, the guiding hole 110 is a plurality of holes arranged at intervals along the circumferential direction of the support body of the basin 112, so that the sound generated by the back surface 1*b* of the loudspeaker 1 can be directed to the front surface 1*a* of the loudspeaker 1 in all directions.

According to some specific embodiments of the application, as shown in FIG. 2 and FIG. 3, the support body 112 also is arranged with a weight losing groove 1121, and the notch of the weight losing groove 1121 faces the back surface 1*b* of loudspeaker 1.

In this embodiment, the support body 112 also is arranged with a weight losing groove 1121. the weight losing groove 1121 plays a certain role in reducing weight, which can reduce the installation strength of loudspeaker 1 and save the production cost of loudspeaker 1. The weight losing groove 1121 faces the back surface 1*b* of the loudspeaker 1, and the weight losing groove 1121 can accommodate a certain space of air, which provides more conduction medium for the conduction of the sound, which is beneficial to the conduction of the sound.

Specifically, the number of weight losing grooves 1121 is multiple, and multiple weight losing grooves 1121 are alternately arranged with multiple guiding holes 110. Such a design is arranged with a compact structure and high space utilization.

Figure 4:
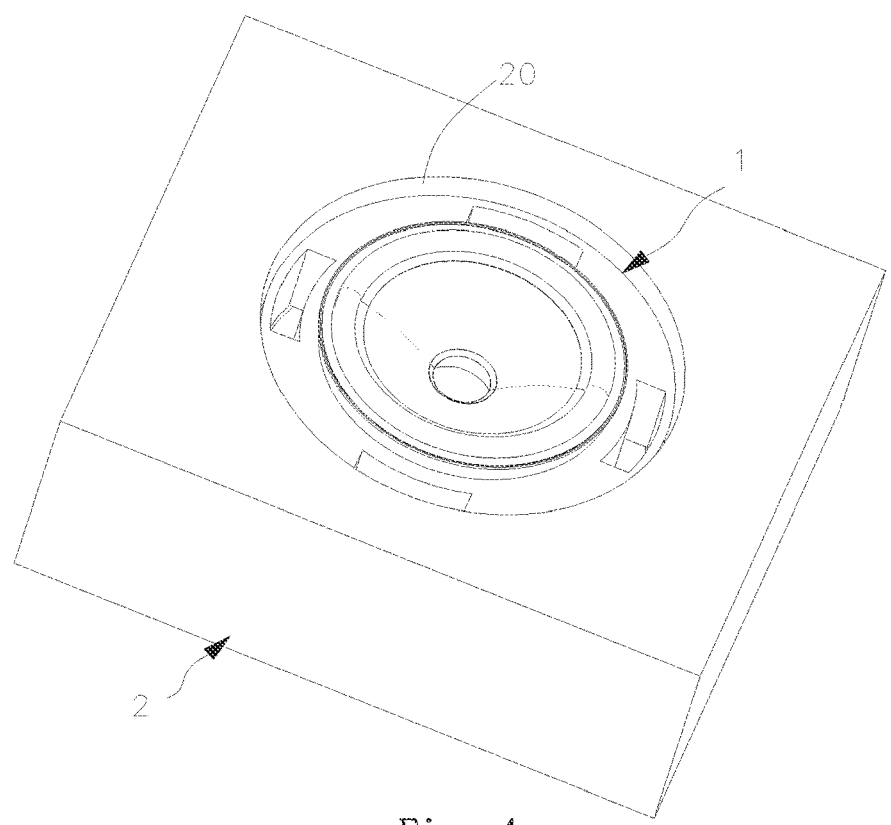
FIG. 4 is an isometric view of an installation structure for the loudspeaker.
Figure 5:
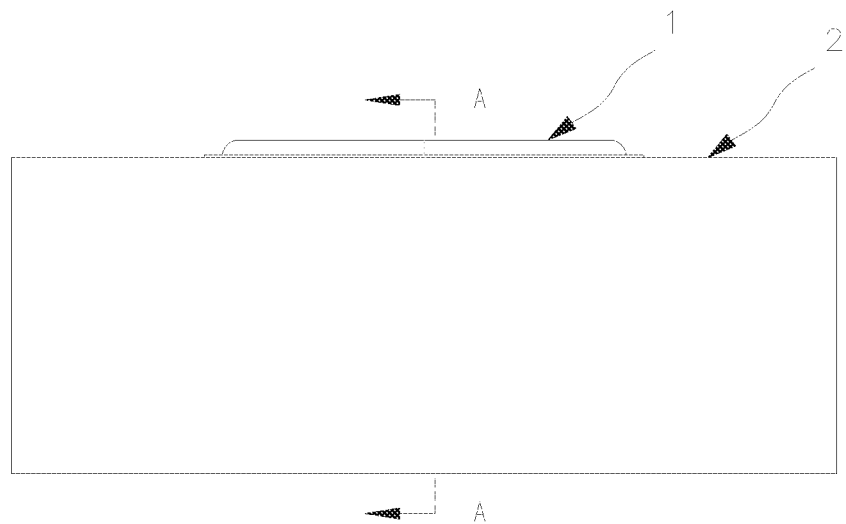
FIG. 5 is a side view of the installation structure in FIG. 4.
Figure 6:
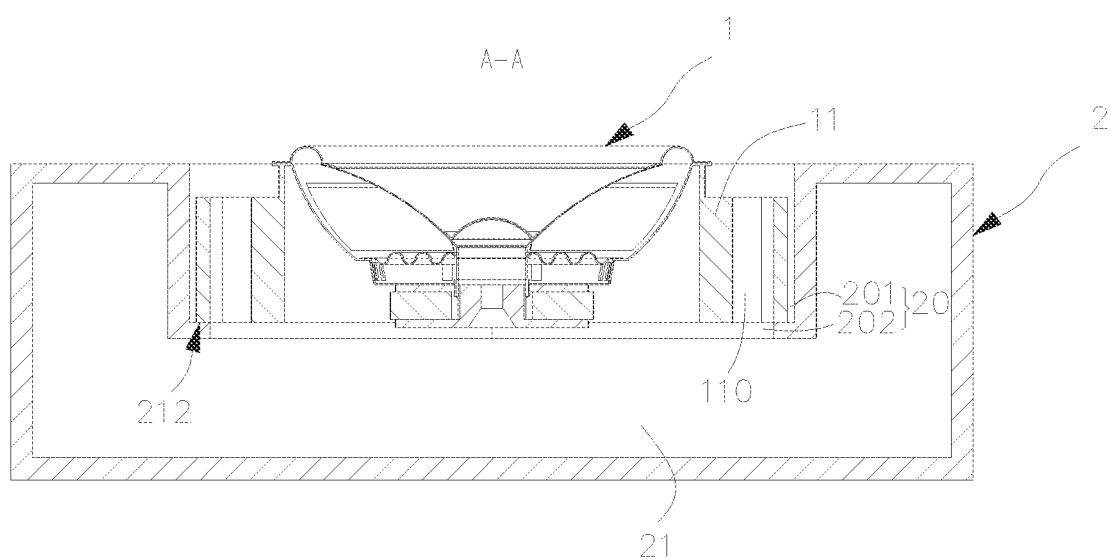
FIG. 6 is a cross-sectional view of the installation structure.

The embodiment of the application also provides an installation structure, as shown in FIGS. 4-6, the installation structure includes a main installation body 2 and a loudspeaker 1 of the application. An installation hole 20 is opened on the main installation body 2. The inner chamber 21 is provided in the main installation body 2, and the inner chamber 21 is connected with the installation hole 20. The loudspeaker 1 is installed in the installation hole 20. The back surface 1*b* of the loudspeaker 1 faces the inner chamber 21. The guiding hole 110 is connected with the inner chamber 21.

The main installation body 2 can be the place where the loudspeaker can be installed, such as the vehicle body and the wall.

In this embodiment, the installation of the loudspeaker 1 on the main installation body 2 is realized by opening the installation hole 20 on the main installation body 2. The main installation body 2 is arranged with an inner chamber 21 that is connected with the installation hole 20. the inner chamber 21 can accommodate a certain space of air. the back surface 1*b* of the loudspeaker 1 faces the inner chamber 21, and the guiding hole 110 is connected with the inner chamber 21. The sound emitted from the back surface 1*b* of the loudspeaker 1 can be conducted through the air in the inner chamber 21, and finally conducted to the front surface 1*a* of the loudspeaker 1 through the guiding hole 110.

According to some specific embodiment of the application, as shown in FIG. 6, the installation hole 20 includes a first mounting hole 201 and a second mounting hole 202 which are connected. The loudspeaker 1 is installed in the first mounting hole 201. The second mounting hole 202 is connected with the inner chamber 21.

In this embodiment, the installation hole 20 includes a first mounting hole 201 and a second mounting hole 202 that communicate with each other. the first mounting hole 201 is used to mount the loudspeaker 1, and the second mounting hole 202 can accommodate air, which is beneficial for sound conduction. The second mounting hole 202 is connected with the inner chamber 21, and the sound emitted from the back surface 1*b* of the loudspeaker 1 can be conducted through the air of the second mounting hole 202 and the air of the inner chamber 21, and finally conducted to the front surface 1*a* of the loudspeaker 1 through the guiding hole 110.

According to some specific embodiment of the application, the hole diameter of the first mounting hole 201 is larger than that of the second mounting hole 202. first mounting hole 201 and the second mounting hole 202, and the installation frame 11 is in contact with the installation surface 212. The installation surface 212 is staggered from the guiding hole 110.

In this embodiment, the installation hole 20 is a stepped hole, the hole diameter of the first mounting hole 201 is larger than that of the second mounting hole 202, and an installation surface 212 is formed between the first mounting hole 201 and the second mounting hole 202. The installation surface 212 plays a certain role of installation and limit, preventing the loudspeaker 1 from falling into the inner chamber 21. When the loudspeaker 1 is installed in the installation hole 20, the installation frame 11 of the loudspeaker 1 abuts against the installation surface 212 to form a tight connection. Meanwhile, the installation surface 212 is staggered from the guiding hole 110 to prevent the installation surface 212 from blocking the guiding hole 110.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An installation structure, including:
a main installation body having an installation hole and an inner chamber communicating with the installation hole;
a loudspeaker having a front surface, a back surface, an installation frame having a guiding hole passing through the front surface and the back surface, and a loudspeaker body engaging with the installation frame; wherein
the loudspeaker is installed in the installation hole, the installation hole includes a first mounting hole and a second mounting hole communicating with the first mounting hole and the inner chamber; the loudspeaker is installed in the first mounting hole, a back surface of the loudspeaker faces the inner chamber; and the guiding hole of the installation frame in the loudspeaker is connected with the inner chamber.

2. The installation structure as described in claim 1, wherein a diameter of the first mounting hole is larger than that of the second mounting hole; an installation surface is formed between the first mounting hole and the second mounting hole; the installation frame is in contact with the installation surface; and the installation surface is staggered from the guiding hole.

3. The loudspeaker as described in claim 1, wherein the installation frame includes:
a frame for supporting the loudspeaker body;
a support body with a central through hole along a height direction for engaging with the frame; and wherein one end of the central through hole is sealed by the loudspeaker body, and the other end is opened; and wherein the guiding hole is formed in the support body along the height direction.

4. The loudspeaker as described in claim 3, wherein the guiding hole is an annular hole opened along a circumferential direction of the support body.

5. The loudspeaker as described in claim 3, including multiple guiding holes arranged along the circumferential direction of the support body.

6. The loudspeaker as described in claim 5 including a weight losing groove formed in the support body, wherein a notch of the weight losing groove faces the loudspeaker.

* * * * *